United States Patent [19]
Mott

[11] 4,201,245
[45] May 6, 1980

[54] DWELL RELAY

[75] Inventor: Richard C. Mott, Harwood Heights, Ill.

[73] Assignee: Honeywell Inc., Minneapolis, Minn.

[21] Appl. No.: 738,816

[22] Filed: Nov. 4, 1976

[51] Int. Cl.² .................. F16K 11/06; G05D 16/00
[52] U.S. Cl. ....................... 137/624.11; 137/625.48; 137/625.66
[58] Field of Search ............. 137/625.48, 625.68, 137/83, 82, 624.11, 625.66

[56] References Cited
U.S. PATENT DOCUMENTS 1,360,396   11/1920   Havens ............................. 137/625.68
2,864,393   12/1958   Drake ..................................... 137/82
3,507,303    4/1970   Wills ................................. 137/525.48

Primary Examiner—Alan Cohan
Attorney, Agent, or Firm—Trevor B. Joike

[57] ABSTRACT

A dwell relay is disclosed for providing a first output which increases from a first reference level to a second reference level in response to an increasing input and a second output which decreases from a third reference level to a fourth reference level in response to the increasing input, and wherein the increasing output and the decreasing output are separated by a dwell period. The first and fourth reference levels may be atmosphere and the second and third reference levels may be a supply pressure.

15 Claims, 7 Drawing Figures

DWELL RELAY

BACKGROUND OF THE INVENTION

The invention relates to a dwell relay which provides a first output which increases, in response to an increasing input, from a first reference level to a second reference level whereat the first output will increase no further and a second output which decreases, in response to further increases in the input, from a third reference level to a fourth reference level wherein the increasing and the decreasing outputs are separated by a dwell period.

A dwell relay which has both an increasing output and a decreasing output separated by a dwell period can have many useful applications. For example, in the control of a heating and air conditioning system the increasing output can be used to control the heating coil and the decreasing output can be used to control a cooling coil such that if the output of the dwell relay is in the dwell period neither heating nor cooling is provided. The dwell period in which neither heating nor cooling is provided can be made as long as comfort requirements permit to save energy during this time in which neither heating nor cooling is provided.

SUMMARY OF THE INVENTION

A dwell relay provides a first output which increases from a first reference level to a second reference level upon an increase of an input and a second output which decreases from a third reference level to a fourth reference level upon a further increase in the input. The first and fourth reference levels may be the same and may be atmosphere, and the second and third reference levels may be the same and may be a supply pressure. The increasing output pressure and the decreasing output pressure are separated by a dwell period.

BRIEF DESCRIPTION OF THE DRAWINGS

These and other features and advantages will become apparent from a detailed consideration of the invention when taken into conjunction with the drawings in which.

DETAILED DESCRIPTION

Figure 1:
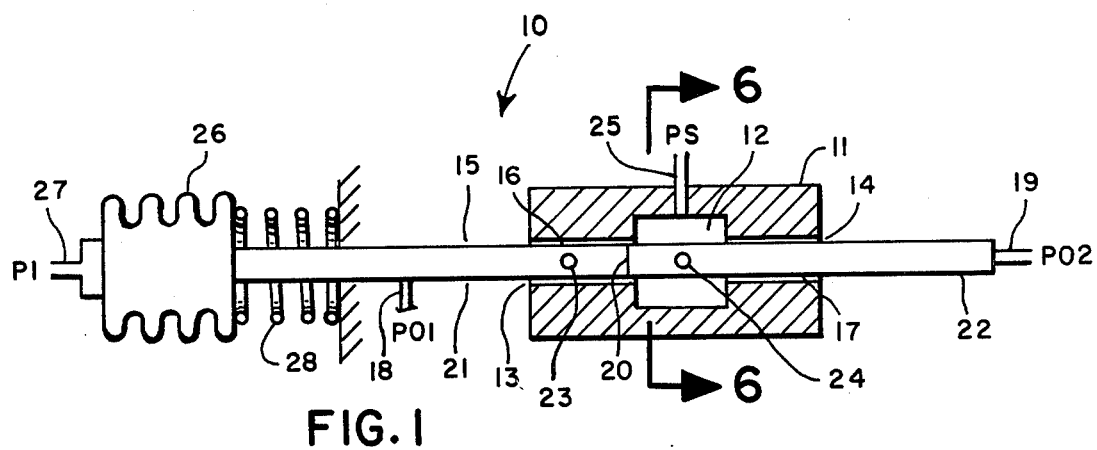
FIG. 1 shows the dwell relay according to the invention.

In FIG. 1, dwell relay 10 has an outer tube 11. The central bore of the outer tube 11 has a chamber 12 separating a first reduced circumference or portion 13 at one end and a second reduced circumference or portion 14 at its other end. An inner tube 15 extends through the bore of the outer tube 11 and with respect to the first and second reduced portions 13 and 14 form first and second respective restrictive passages 16 and 17.

Inner tube 15 is a hollow tube which has an output 18 communicating with the central bore of the inner tube 15 for bringing out a first output pressure and an output 19 communicating with the central bore of the inner tube 15 for bringing out a second output pressure. The inner tube 15 is divided by a wall 20 into a first half or end 21 and a second half or end 22. An aperture 23 is used to communicate from restrictive passage 16 to output 18 and an aperture 24 is used to communicate from restrictive passage 17 to output 19. A connecting means 25 is used to supply a supply pressure to chamber 12 such that the entire chamber 12 is at supply pressure.

Within restrictive passage 16 formed between the outer tube 11 and the inner tube 15 is formed a linear pressure gradient between the first reference level, which may be atmosphere at the lefthand end of outer tube 11, and the second reference level, which may be the supply pressure in chamber 12. The aperture 23 is used to pick off any pressure along this gradient and supply that pressure at the first output 18 depending upon the position of inner tube 15 within outer tube 11. The restrictive passage 17 formed between the outer tube 11 and the inner tube 15 establishes a second pressure gradient from a third reference level, which is the supply pressure within the chamber 12, to a fourth reference level, which may be atmosphere at the righthand end of the outer tube 11. The aperture 24 is used to pick off any pressure along this pressure gradient, depending upon the position of inner tube 15 within outer tube 11, and supplies this pressure through the portion 22 of the inner tube 15 to the output 19.

The inner tube 15 is moved back and forth through the outer tube 15 by a bellows 26 which has an input means or input connecting means 27 for connection to an input pressure. The bellows 26 is biased by a spring 28 such that, when there is no prssure supplied to the connecting means 27, the inner tube 15 will return to a predetermined initial position.

Figure 2:
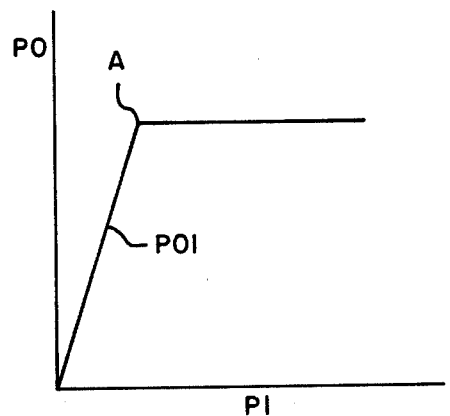
FIG. 2 shows the response curve for the first output of the relay.

FIG. 2 shows the response curve for the output pressure of output 18 in response to an increasing input pressure at input means 27. With the input pressure zero, the aperture 23 is at the lefthand end of the outer tube 11, i.e., at its connection to the first reference level which may be atmosphere. Thus, the output pressure at connecting means 18 is at the first reference level. As the input pressure increases, the inner tube 15 moves to the right as does the aperture 23 such that the aperture 23 moves along the increasing pressure gradient of the restrictive passage 16. As the aperture moves in this manner, the output pressure increases until the aperture reaches the chamber 12 at which time any further movement in response to increasing input pressure will not increase the output pressure. Thus, the output pressure peaks out at the second reference level which may be the supply pressure within the chamber 12.

Figure 3:
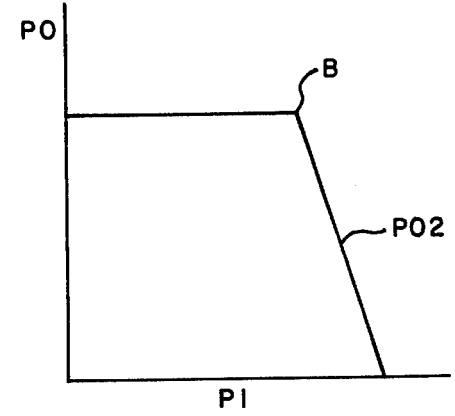
FIG. 3 shows the response curve of the second output of the relay.

During this increasing input pressure, the aperture 24 has moved to the right through the chamber 12 such that the output pressure at output 19 is at the third reference level which, as shown in FIG. 1, is the supply pressure. As shown in FIG. 3, when the input pressure has increased a sufficient amount, aperture 24 enters restrictive passage 17 and the output pressure at output 19 begins to decrease from the third reference level to the fourth reference level, which may be atmosphere at the righthand end of outer tube 11. Thus, as the aperture 24 moves along the pressure gradient established along the restrictive passage 17, the output pressure at output 19 will decrease until the aperture 24 reaches the right-hand end of outer tube 11.

Figure 4:
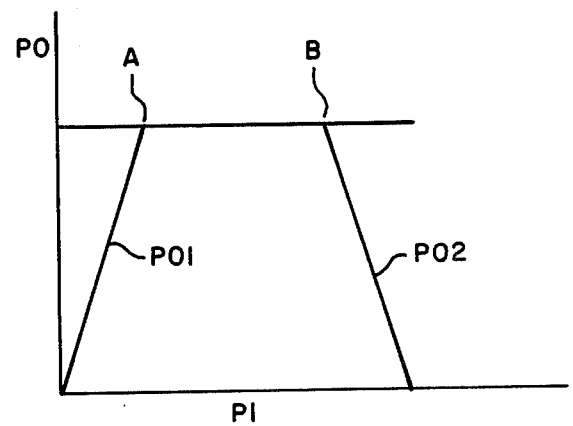
FIG. 4 shows an overlay of the response curves of FIGS. 2 and 3.

Since the first and fourth reference levels are assumed to be the same and since the second and third reference levels are assumed to be the same, which may be the supply pressure, the curves of FIGS. 2 and 3 may be overlaid and the curves of FIG. 4 result. The dwell period is defined by the separation between points A and B. Point A is the point at which the aperture 23 has reached the chamber 12 so that the output pressure at the first output 18 will no longer increase and point B is the point at which the aperture 24 has reached the restrictive passage 17 such that the output pressure at output 19 will begin to decrease. Thus, it can be seen that the amount of separation between points A and B depends upon the length of the chamber 12 or, in other words, the separation between the restrictive passage 16 and the restrictive passage 17. The separation between points A and B is the distance within which the apertures 23 and 24 may move without either entering a restrictive passage. Thus, it is apparent that the separation between points A and B may be adjusted by adjusting the length of the chamber 12. It should be also apparent that the slope of the curve of FIG. 2 can be adjusted by adjusting the length of the restrictive passage 16 and the slope of the curve of FIG. 3 can be adjusted by adjusting the length of the restrictive passage 17. Shorter restrictive passages will result in steeper slopes and longer restrictive passages will result in less steep slopes.

Figure 5:
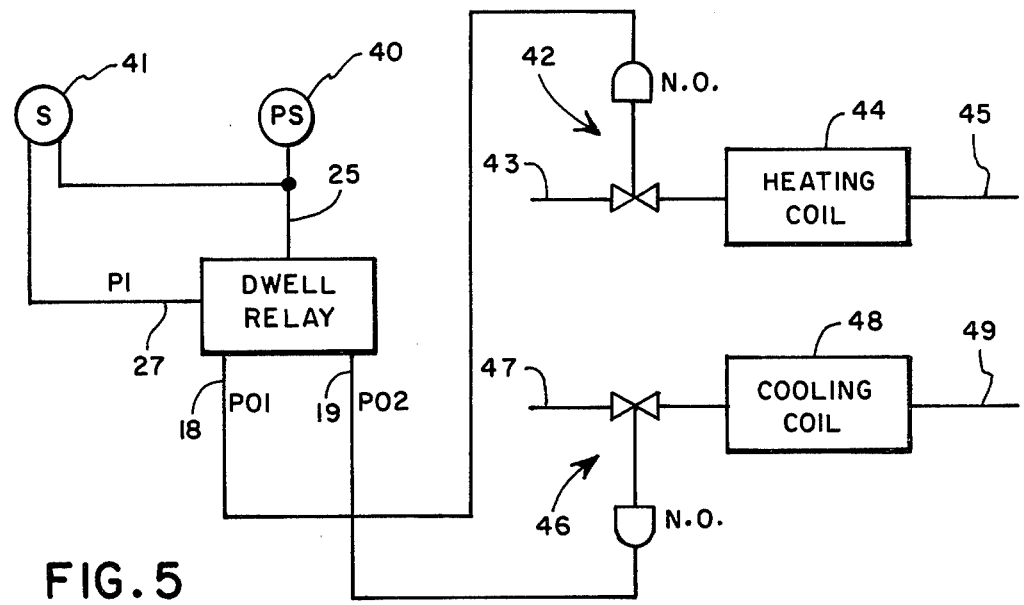
FIG. 5 shows the dwell relay used in a heating and cooling system.

FIG. 5 shows the type of system in which the dwell relay in FIG. 1 can be used. A supply pressure 40 is connected to the input 25 of the dwell relay and is also connected to an input of a stat 41, which may be a thermostat, the output of which is connected as an input to the input 27 of the dwell relay. The first output 18 is connected to a normally open valve 42 which controls the supply of heat exchange fluid from a supply line 43 through a heat exchange coil 44 to a return line 45. The output 19 is connected to a normally open valve 46 which controls the supply of heat exchange medium from an inlet 47 through a cooling coil 48 to a return line 49.

With zero input from the stat 41, and relying upon the curves of FIGS. 2 and 3, no input will be supplied by the output 18 to the normally open valve 42 so that the valve is fully open to supply heat exchange fluid to the heating coil 44. At the same time, the output 19 is at its maximum pressure which completely closes the normally open valve 46. As the temperature to which the thermostat 41 is exposed increases, the output from thermostat 41 increases and the output 18 increases. As the pressure from output 18 increases, the normally open valve 42 begins to close to begin decreasing the amount of heat exchange medium supplied to the heating coil 44. As the increasing output pressure from this thermostat 41 reaches a point where the output curve shown in FIG. 2 reaches point A, the output pressure at output 18 will be at its maximum and normally open valve 42 will be completely closed. At this point, the output pressure at output 19 is also at its maximum so that the normally open valve 46 is closed. With both valves closed, neither heating nor cooling is being conducted.

As the input pressure increases, the aperture 24 will move to the restrictive passage 17 which is represented as point B on the curve of FIG. 3. At this point, the output pressure at output 19 begins to decrease which begins to allow normally open valve 46 to open. As normally open valve 46 begins to open heat exchange fluid is supplied from supply line 47 to the cooling coil 48 and the cooling operation is begun. As the temperature to which thermostat 41 is exposed continues to increase, the input pressure at input 27 continues to increase which continues to decrease the output pressure at output 19 for further opening of the valve 46. When the output pressure reaches the fourth reference level, which may be atmosphere, the valve 46 is fully open and the maximum heat exchange fluid is being supplied to the cooling coil 48.

During the dwell period between points A and B, however, the system is neither heating nor cooling.

The outer tube 11 and inner tube 15 may take various geometric forms. As shown in an end view of FIG. 6, this geometric form may be circular or as shown in FIG. 7 this geometric form may be square. As used herein, the term tube applies to any hollow geometric form wherein the inner tube 15 can slide through the outer tube 11.

Figure 6:
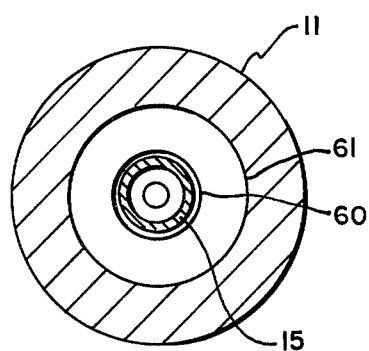
FIG. 6 shows an end view of one geometric shape that the dwell relay make take; and, FIG. 7 shows an alternative geometric shape for the dwell relay.
Figure 7:
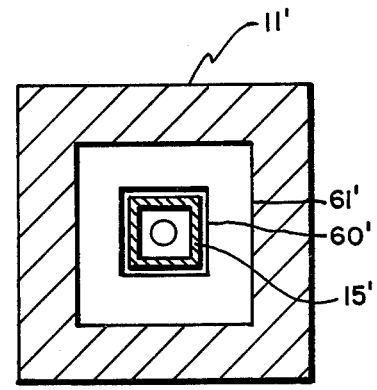

In FIG. 6, reference numeral 11 points to the outer circumference of the outer tube whereas reference numeral 60 denotes a first inner circumference of outer tube 11 defining the restrictive passage. The line 61 denotes a second inner circumference, greater than the first inner circumference, defining the chamber 12. The arrangement of FIG. 7 is of similar construction.

From a review of the above, it is apparent that certain modifications can be made without departing from the scope of the invention, and, therefore, this invention is to be limited only by the appended claims.

The embodiments of the invention in which an exclusive property or right is claimed are defined as follows:

1. A dwell relay comprising:
input means for supplying an input;
supply means for the supply of a supply pressure;
first output means for the supply of a first output pressure;
second output means for the supply of a second output pressure; and,
first means for connecting said supply means to said first output means and second means for connecting said supply means to said second output means, said first and second means connected to said input means whereby as said input increases said first output pressure increases from a first reference level to a second reference level and, upon a further increase in said input, said second output pressure decreases from a third reference level to a fourth reference level, wherein said increase of said first output pressure is separated by a dwell period from said decrease of said second output pressure.

2. The relay of claim 1 wherein said input means comprises: a means to receive an input pressure.

3. The relay of claim 1 wherein said first and fourth reference levels are atmosphere and said second and third reference levels are said supply pressure.

4. The relay of claim 1 wherein said first and second means comprises outer tube means having first and second ends and a chamber between said first and second ends, and inner tube means within said outer tube means forming first and second restrictive passages with said first and second ends of said outer tube means respectively, said first and second restrictive passages each having first and second ends, said first end of said first passage exposed to said first reference level, said first end of said second passage exposed to said fourth reference level, said second ends of said first and second passages opening into said chamber, said chamber being connected to said supply means such that said supply pressure forms said second and third reference levels, said inner tube means having a dividing wall separating first and second ends of said inner tube means, a first aperture between said dividing wall and said first end of said inner tube means for communicating said first restrictive passage to said first output means, and a second aperture between said dividing wall and said second end of said inner tube means for communicating said second restrictive passage to said second output means.

5. The relay of claim 4 wherein said input means comprises a thermostat for supplying said input in the form of an input pressure dependent upon temperature.

6. The relay of claim 4 wherein said first and second ends of said outer tube means are open to atmosphere, atmosphere forming said first and fourth reference levels.

7. The relay of claim 4 further comprising first load means connected to said first output means and second load means connected to said second output means.

8. The relay of claim 7 wherein said first and second load means are normally open valves.

9. The relay of claim 8 wherein said input means comprises a thermostat for supplying said input in the form of an input pressure dependent upon temperature.

10. The relay of claim 1 wherein said first and second means comprise outer tube means having an outer circumference and first and second ends separated by a chamber and wherein said first and second ends have a first inner circumference and said chamber has a second inner circumference greater than said first inner circumference, and inner tube means within said outer tube means forming a first restrictive passage with said first end of said outer tube having said first inner circumference and a second restrictive passage with said second end of said outer tube having said first inner circumference, said first and second restrictive passages each having first and second ends, said first end of said first passage exposed to said first reference level, said first end of said second passage exposed to said fourth reference level, said second ends of said first and second passages opening into said chamber, said chamber being connected to said supply means wherein said supply pressure forms said second and third reference levels, said inner tube means having a dividing wall separating first and second ends of said inner tube means, a first aperture between said dividing wall and said first end of said inner tube means for communicating said first restrictive passage to said first output means, and a second aperture between said dividing wall and said second end of said inner tube means for communicating said second restrictive passage to said second output means.

11. The relay of claim 10 wherein said input means comprises a thermostat for supplying said input in the form of an input pressure dependent upon temperature.

12. The relay of claim 10 wherein said first and second ends of said outer tube means are connected to atmosphere.

13. The relay of claim 10 further comprising first load means connected to said first output means and second load means connected to said second output means.

14. The relay of claim 13 wherein said first and second load means are normally open valves.

15. The relay of claim 14 wherein said input means comprises a thermostat for supplying said input in the form of an input pressure dependent upon temperature.

* * * * *